(12) United States Patent
Gopalan

(10) Patent No.: US 8,855,246 B2
(45) Date of Patent: Oct. 7, 2014

(54) DEMODULATING A DATA PACKET BASED ON A DETECTED SYNC WORD

(71) Applicant: QUALCOMM Incroporated, San Diego, CA (US)

(72) Inventor: RaviKiran Gopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 13/786,676

(22) Filed: Mar. 6, 2013

(65) Prior Publication Data

US 2014/0254724 A1    Sep. 11, 2014

(51) Int. Cl.
*H04L 27/06* (2006.01)
*H04L 7/00* (2006.01)

(52) U.S. Cl.
CPC .................................. *H04L 7/0087* (2013.01)
USPC ........................................ 375/340; 375/365

(58) Field of Classification Search
USPC ................... 375/316, 340, 365, 368
See application file for complete search history.

(56) References Cited

U.S. PATENT DOCUMENTS

| | | | | |
|---|---|---|---|---|
| 4,519,068 A * | 5/1985 | Krebs et al. | .................... | 370/329 |
| 5,875,387 A * | 2/1999 | Ayerst | .......................... | 340/7.42 |
| 5,878,352 A * | 3/1999 | Souissi et al. | ................. | 455/503 |
| 5,905,448 A * | 5/1999 | Briancon et al. | ............. | 340/7.43 |
| 6,445,719 B1 * | 9/2002 | Schneider et al. | ............ | 370/506 |
| 8,135,097 B2 | 3/2012 | Farmer et al. | | |
| 8,243,651 B2 | 8/2012 | Dankberg et al. | | |
| 2005/0264907 A1* | 12/2005 | Dati et al. | ........................ | 360/48 |
| 2009/0304127 A1* | 12/2009 | Massam et al. | ............... | 375/343 |
| 2010/0172647 A1 | 7/2010 | Luo et al. | | |
| 2010/0316117 A1 | 12/2010 | Villion et al. | | |
| 2012/0171966 A1 | 7/2012 | Guo | | |

* cited by examiner

*Primary Examiner* — Emmanuel Bayard
(74) *Attorney, Agent, or Firm* — Austin Rapp & Hardman

(57) ABSTRACT

In a particular embodiment, a method includes receiving a first portion of a sync field of a packet at a receiver. The sync field includes the first portion and a second portion. The packet includes the sync field and a payload field. The method includes detecting a sync word associated with the packet. The sync word is detected based on the first portion of the sync field and prior to receiving the second portion of the sync field. The method initiates a demodulation stage of the receiver prior to receiving an initial bit of the payload field. Initiating the demodulation stage prior to receipt of the initial bit of the payload field enables a demodulator to perform initial demodulation activity prior to demodulation of the payload field. Demodulation continues if, after the second portion is received, the entire received sync field matches the detected sync word.

34 Claims, 5 Drawing Sheets

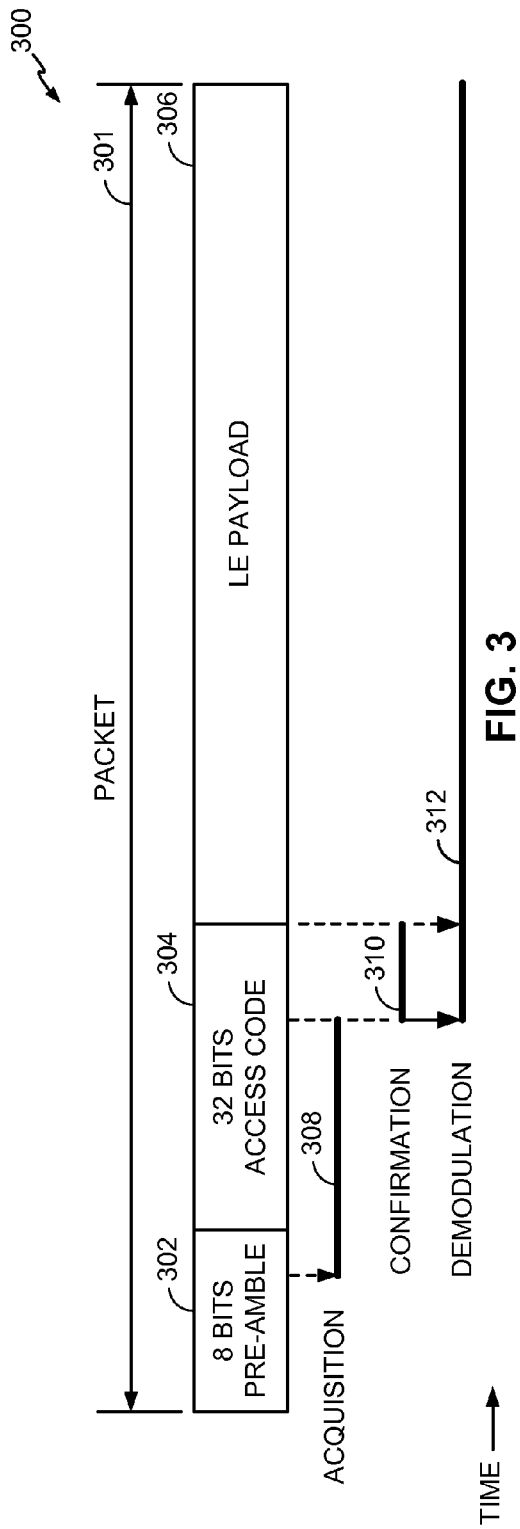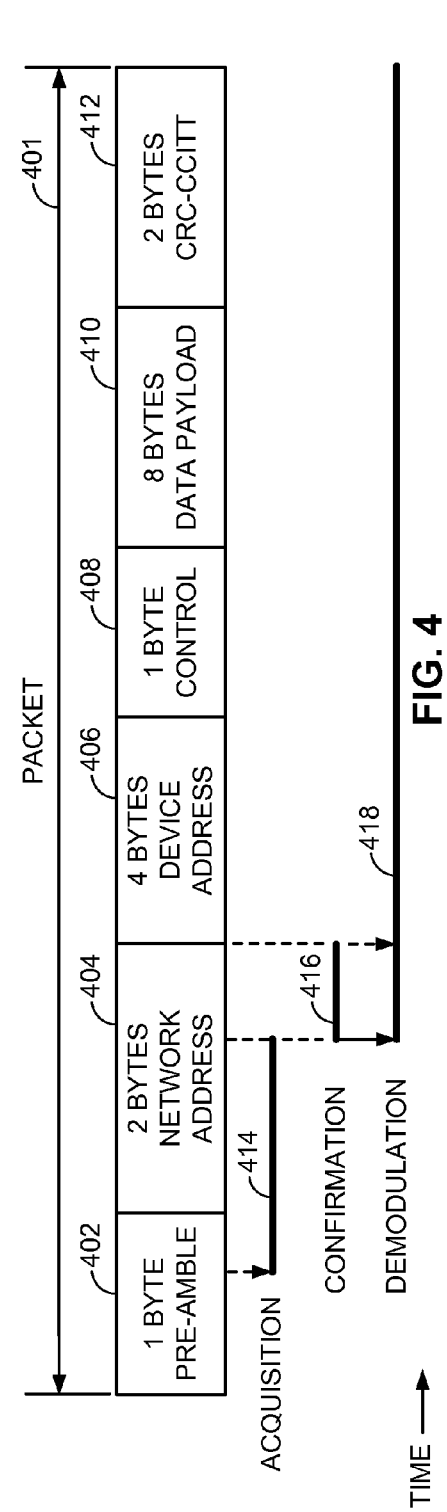

DEMODULATING A DATA PACKET BASED ON A DETECTED SYNC WORD

FIELD OF THE DISCLOSURE

The present disclosure is generally directed to demodulating data packets received via a wireless receiver device.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

In a wireless receiver device having a correlator based acquisition communication scheme, timing recovery, frequency estimation, and packet identification are typically performed by hardware after an entirety of a sync word included in a packet (e.g., a data packet) is received. Based on the received sync word, a demodulator is then synchronized (e.g., symbol synchronized) and initialized (e.g., primed) to process (e.g., demodulate) a payload of the packet.

Synchronization and initialization of the demodulator consume processing cycles in addition to processing cycles to receive the sync word. Data packet processing latency is introduced due to the additional processing cycles. Communication schemes that do not account for the additional processing cycles risk the demodulator failing to process one or more initial bits of the received payload. One approach to account for the additional processing cycles has been to include a "trailer" (e.g., multiple bits) between the sync word and the payload. A communication scheme that includes a trailer in a data packet is inefficient because each bit of the data packet is not used for transmitting data (i.e., the trailer does not contain used data). Another approach has been to buffer incoming data to enable initial timing and frequency estimate calculations to be completed. This approach results in additional components, memory requirements, and circuit (e.g., chip) area.

SUMMARY

A technique for synchronizing and/or initializing a demodulator is disclosed. The technique may include dividing an acquisition phase of a communication scheme into two stages. During a first stage (e.g., an acquisition stage), a first portion of a sync field (e.g., a sync word field or a unique word) of a data packet is received and a sync word associated with the data packet is detected. The sync word may be detected based on less than an entirety of the sync field. During a second stage (e.g., a confirmation stage), a confirmation whether the detected sync word is correct is determined based on the first portion of the sync field and the second portion of the sync field (e.g., an entirety of the received sync field). Additionally, a demodulation stage may be initiated, based on the detected sync word, prior to receiving an entirety of the sync field and prior to receiving a payload field of the data packet. At least a portion of the demodulation stage may occur concurrently with the second stage. During the demodulation stage, a demodulator is primed prior to receiving a payload field of the data packet.

When the confirmation stage determines that the detected sync word is correct, the demodulator demodulates the payload field. For example, the confirmation stage may determine (e.g., verify) that the detected sync word is correct when the detected sync word matches the received first portion of the sync field and the received second portion of the sync field. The confirmation stage may verify the detected sync word concurrently with the demodulator being primed during the demodulation stage. When the detected sync word is determined to be correct, the demodulator may demodulate the payload field without being stopped by the confirmation stage. By using the detected sync word (that is detected prior receiving an entirety of the sync field) to initiate the demodulator, the demodulator may be sufficiently primed to process (e.g., demodulate) the payload field without use of a trailer field in the data packet and without buffering incoming data included in the data packet.

In a particular embodiment, a method includes receiving a first portion of a sync field of a packet at a receiver. The sync field includes the first portion and a second portion. The packet includes the sync field and a payload field. The method includes detecting a sync word associated with the packet. The sync word is detected based on the first portion of the sync field and prior to receiving the second portion of the sync field; the method initiates a demodulation stage of the receiver prior to receiving an initial bit of the payload field. Initiating the demodulation stage prior to receipt of the initial bit of the payload field enables a demodulator to perform initial demodulation activity prior to demodulation of the payload field.

In another particular embodiment, a wireless device includes a receiver configured to receive data packets. At least one of the data packets includes a sync field and a payload field. The receiver includes an acquisition module, a detection module, and a demodulator. The acquisition module is configured to receive a first portion of the sync field. The sync field includes the first portion and a second portion. The detection module is configured to detect a sync word associated with the at least one of the data packets. The sync word is detected based on the first portion of the sync field and prior to receiving the second portion of the sync field. The demodulator is configured to be initiated prior to the receiver receiving an initial bit of the payload field.

In a further particular embodiment, an apparatus includes means for receiving a sync field of a packet. The sync field includes a first portion and a second portion. The packet includes the sync field and a payload field. The apparatus also includes means for detecting a sync word associated with the packet. The sync word is detected based on the first portion of the sync field and prior to receiving the second portion of the sync field. The apparatus also includes means for initiating a demodulator prior to receiving an initial bit of the payload field.

In another particular embodiment, a non-transitory computer readable medium includes instructions that, when executed by a processor, cause the processor to receive a sync field of a packet. The packet includes the sync field and a payload field. The sync field includes a first portion and a second portion. The computer readable medium further includes instructions, executable by the processor, to cause the processor to detect a sync word associated with the packet. The sync word is detected based on receipt of the first portion of the sync field and prior to receiving the second portion of the sync field. The computer readable medium further includes instructions, executable by the processor, to cause the processor to initiate a demodulator prior to receiving an initial bit of the payload field.

One particular advantage provided by the disclosed embodiments is a communication scheme that enables a demodulator to process (e.g., demodulate) a payload field of a data packet that does not include a "trailer," and to do so without buffering the data packet. By initiating demodulation based on detection of a sync word, the demodulator may enable use of bits in the data packet for transmitting information (e.g., the data packet does not require a "trailer" between the sync field and the payload) without incurring additional components, memory requirements, and circuit (e.g., chip) area associated with buffering incoming data associated with a received packet.

Other aspects, advantages, and features of the present disclosure will become apparent after review of the application, including the following sections: Brief Description of the Drawings, Detailed Description, and the Claims.

BRIEF DESCRIPTION OF THE DRAWINGS

FIG. 3 is a timing diagram that illustrates a communication scheme to receive a data packet having a low energy (LE) format;

FIG. 4 is a timing diagram that illustrates a communication scheme to receive a data packet having an ANT format;

DETAILED DESCRIPTION

Figure 1:
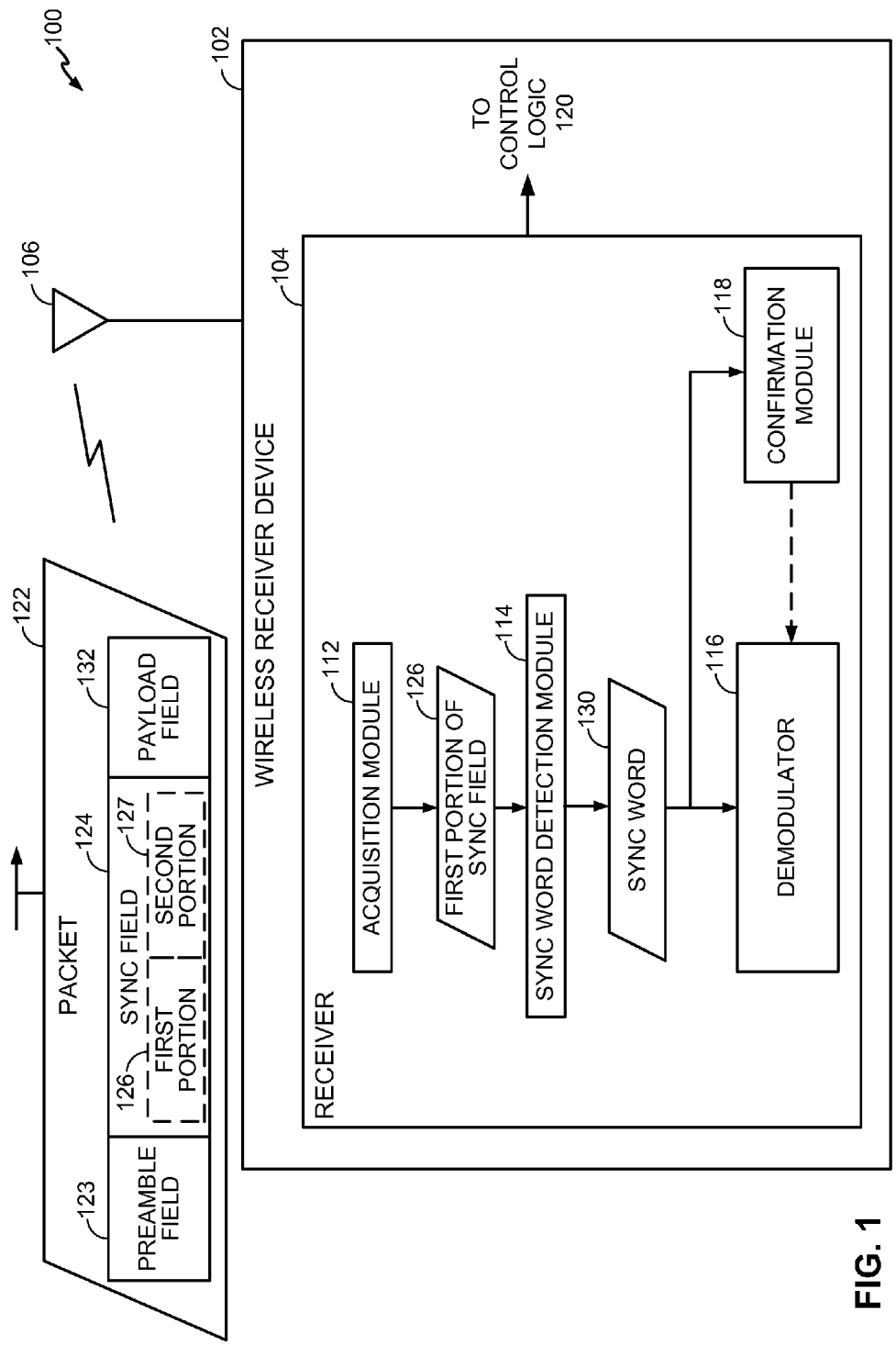
FIG. 1 is a block diagram of a first illustrative embodiment of a wireless receiver device including sync word detection logic.

Referring to FIG. 1, a particular illustrative embodiment of a wireless communication system 100 is shown. The wireless communication system 100 includes a wireless receiver device 102 having an antenna 106. The wireless receiver device 102 may receive one or more packets, such as a packet 122. The packet 122 may include a preamble field 123, a sync field 124, and a payload field 132. The wireless receiver device 102 may be configured to process the packet 122 without buffering or requiring a trailer to be included in the packet 122, as further described herein.

The wireless communication system 100 may include one or more additional wireless devices (not shown). The one or more additional wireless devices may be configured to transmit packets, such as the packet 122, between the one or more additional wireless devices and the wireless receiver device 102. The one or more additional wireless devices may transmit the one or more packets via a wireless communications interface, such as a Bluetooth interface. While the wireless receiver device 102 is shown as receiving a single packet, it should be understood that in other embodiments, the wireless receiver device 102 may alternatively receive multiple packets transmitted to the wireless receiver device 102 from the one or more additional wireless devices. Thus, the wireless receiver device 102 may receive multiple packets from multiple devices in various embodiments.

The wireless receiver device 102 may establish a connection with (e.g., pair with) another wireless device (not shown). A discovery process, that may be based on a standard (e.g., an Institute of Electrical and Electronics Engineers (IEEE) 802.11 standard or an IEEE 802.15 standard), may be used during which the wireless receiver device 102 discovers the other wireless device. Alternatively, the other wireless device may discover the wireless receiver device 102. After the wireless receiver device 102 and the other wireless device discover (e.g., find) each other, the wireless receiver device 102 and the other wireless device may engage in a pairing process in which a particular sync word (e.g., a data pattern) is established for use by each of the two devices. The sync word may be used by the wireless receiver device 102 and the other wireless device to establish timing relationships between the wireless receiver device 102 and the other wireless device that enable one or more data packets to be communicated, as described herein. For example, each of the wireless receiver device 102 and the other wireless device may store the sync word (e.g., the data pattern) for use when generating a data packet and receiving a data packet communicated between the wireless receiver device 102 and the other wireless device.

The wireless receiver device 102 may include a receiver 104 and the antenna 106. The receiver 104 may be configured to receive a packet, such as the packet 122, via the antenna 106. For example, a signal (e.g., an incoming data stream associated with the packet 122) may be received via the antenna 106 and propagated to the receiver 104. The receiver 104 may include various components and may be configured to provide an output to control logic 120 to communicate received data or other information. For example, the receiver 104 may provide an output corresponding to demodulated payload data of the packet 122 and the control logic 120 may be configured to process the demodulated payload data.

The receiver 104 may include an acquisition module 112, a sync word detection module 114, a demodulator 116, and a confirmation module 118. In a particular embodiment, each of the modules 112-114 and 118 and the demodulator 116 included in the receiver 104 may be implemented as either software, hardware, or a combination thereof, depending on a particular design or other implementation considerations. While the wireless receiver device 102 is shown as including the receiver 104, it should be understood that in other embodiments, the functionality of the receiver 104 may be implemented in alternative devices such as a transceiver unit. Thus, the wireless receiver device 102 may be configured to both receive and send data packets in various embodiments.

Referring to the packet 122, the sync field 124 may follow the preamble field 123, and the payload field 132 may follow the sync field 124. In particular, the payload field 132 may sequentially (e.g., immediately) follow in the packet 122 after the sync field 124. To further clarify, there are no additional bits or words between the sync field 124 and the payload field 132 in a particular embodiment. The sync field 124 may correspond to a sync word (e.g., a sync identifier) to enable recovery of a clock signal to be used by the demodulator 116 to demodulate the payload field 132. The sync word may be known to the receiver device 102 based on a standard (e.g., a wireless standard) or as a result of a connection process (e.g., a pairing processes) with a wireless device. For example, one or more sync words may be stored in a storage location (not shown), such as a memory or a register, of the receiver device 102. The sync word may identify various timing aspects of a signal corresponding to the packet 122 to enable the demodulator 116 to obtain synchronization prior to the demodulator 116 performing demodulation of the payload field 132 (e.g., prior to an initial bit of the payload field 132 being demodulated).

A packet detection module (not shown), such as a radio frequency (RF) detection module, may be configured to detect energy associated with a packet transmission, such as a transmission of the packet 122. The packet 122 may be sent from a wireless device that is attempting to pair with (e.g., establish a communication link with) the receiver device 102 or that is paired with (e.g., completed a pairing process with) the receiver device 102. The packet detection module may detect the packet 122 based on at least a portion of the preamble field 123 of the packet 122 (e.g., based on a detected energy pattern). The packet detection module may be executed in combination with other components such as the acquisition module 112 to perform reception functions within the receiver 104 with respect to the packet 122. After the packet 122 is detected by the packet detection module, processing of the packet 122 may be controlled by the acquisition module 112. For example, the acquisition module 112 may be initiated during reception of the preamble field 123 by the receiver 104.

The acquisition module 112 may be configured to identify a beginning of the sync field 124 (e.g., an end of the preamble field 123). The acquisition module 112 may be activated when the packet detection module (e.g., an energy detection module) detects an amount of energy (e.g., a waveform) characteristic of a transmission of a packet. The acquisition module 112 may further be configured to receive at least a first portion 126 of the sync field 124. For example, the sync field 124 may sequentially follow the preamble field 123 and may include the first portion 126 and a second portion 127. The first portion 126 of the sync field 124 may be an initial portion of the sync field 124 and includes less than an entirety of the sync field 124. Further details regarding the first portion 126 and the second portion 127 of the sync field 124 of the packet 122 are described with reference to FIG. 2.

The sync word detection module 114 may be configured to detect a sync word 130 associated with the packet 122 based on the first portion 126 of the sync field 124. For example, the first portion 126 of the sync field 124 may be received by the acquisition module 112 and communicated to the sync word detection module 114, as illustrated in FIG. 1. The sync word 130 may be detected prior to the receiver 104 receiving the second portion 127 of the sync field 124. For example, the sync word detection module 114 may detect the sync word 130 prior to receiving an entirety of the sync field 124. The sync word detection module 114 may receive the first portion 126 of the sync field 124 and compare the first portion 126 of the sync field 124 to one or more stored sync word values. For example, a memory (not shown) may store sync word values (e.g., sync words) for one or more other wireless devices that the wireless receiver device 102 is paired with. In a particular embodiment, the memory may store the sync word values in a data structure, such as a table or a list. The sync word detection module 114 may select the sync word 130 as a particular sync word from the one or more stored sync word values based on the particular sync word including (e.g., matching) the first portion 126 of the sync field 124. In the event that more than one sync word values of the one or more stored sync word values matches the first portion 126 of the sync field 124, the sync word detection module 114 may determine the sync word 130 based on a recently received or used sync word, hysteresis, or a detection algorithm. The sync word detection module 114 may generate the sync word 130 after the sync word detection module 114 selects the particular sync word from the one or more sync word values. When the sync word detection module 114 detects and/or selects the sync word 130, the sync word detection module 114 may generate the sync word 130 to be passed to the demodulator 116 and/or the confirmation module 118, as shown in FIG. 1.

The demodulator 116 receives the sync word 130 generated by the sync word detection module 114. For example, the sync word 130 may be sent from the sync word detection module 114 to the demodulator 116. In an alternative embodiment, the demodulator 116 may receive the first portion 126 of the sync field 124 from the acquisition module 112 and may receive a remainder of the sync word 130 (e.g., associated with the second portion 127 of the sync field 124) from the sync word detection module 114.

The demodulator 116 may be initiated upon receipt of the sync word 130 by the demodulator 116. For example, the demodulator 116 may be initiated (e.g., based on the sync word 130) prior to the receiver 104 receiving an initial bit of the payload field 132 (e.g., prior to receiving a final bit of the sync field 124). The demodulator 116 may be initiated to be synchronized with an incoming packet (e.g., the packet 122) and initialized to process incoming data of the packet 122. For example, the demodulator 116 may be synchronized to achieve symbol synchronization with the packet 122 and may be initialized (e.g., primed) for a primer period to enable the demodulator 116 to process the incoming data of the packet 122. In a particular embodiment, the demodulator 116 may be primed (e.g., fully primed) prior to the receiver 104 receiving the initial bit of the payload field 132. In a particular embodiment, a number of bits in the second portion 127 of the sync field 124 is determined based on a primer time period of the demodulator 116. Thus, the demodulator 116 may be configured to perform certain initial demodulation activity, such as configuration and startup activities, prior to receipt of any portion of the payload field 132. In this manner, the demodulator 116 may get an early start and perform initial demodulation activities prior to receiving a first bit (e.g., a start bit) of the payload field 132. Based on a length of time associated with the initial demodulation activities, the demodulator 116 may be fully primed prior to receiving the last bit of the sync field 124 or may not be fully primed until after the last bit of the sync field 124 is received.

One exemplary activity that may be performed by the demodulator 116 prior to receipt of any portion of the payload field 132 is initial clock recovery. For example, since the demodulator 116 receives the sync word 130, the demodulator 116 may perform initial clock recovery and synchronization activities based on the sync word 130. In a particular embodiment, a frequency of a clock signal of the demodulator 116 is set based on the sync word 130. Other exemplary activities that may be performed by the demodulator 116 include frequency estimation, packet identification (e.g., identifying a format of a received packet, such as the packet 122), and other synchronization operations. By performing such processing prior to receipt of the entirety of the sync field 124 (e.g., prior to receipt of any bit of the payload field 132), the demodulator 116 may be ready to perform demodulation upon reception of the initial bit of the payload field 132.

The demodulator 116 may be configured to demodulate the payload field 132 when the confirmation module 118 determines that the sync word 130 generated by the sync word detection module 114 is correct (e.g., the sync word 130 matches the first portion 126 and the second portion 127 of the sync field 124). For example, the demodulator 116 may be initiated prior to receipt of the payload field 132 and the demodulator 116 may demodulate the payload field 132 during reception of the payload field 132. The demodulator 116 may be stopped if the confirmation module 118 determines that the sync word 130 is incorrect, as described further herein. When demodulation of the payload field 132 is stopped in response to a determination that the sync word 130 generated by the sync word detection module 114 is incorrect, the demodulation may be stopped prior to demodulating an entirety of the payload field 132.

The confirmation module 118 may be configured to determine whether the sync word 130 generated by the sync word detection module 114 is correct based on at least the second portion 127 of the sync field 124. For example, the confirmation module 118 may be initiated after the first portion 126 of the sync field 124 is received by the acquisition module 112. Additional timing details are described further herein with reference to FIG. 2. After initiation, the confirmation module 118 may receive the second portion 127 of the sync field 124 and determine whether the sync word 130 is correct. For example, the confirmation module 118 may make a determination whether the sync word 130 is correct based at least on a comparison of a second portion of the sync word 130 to the second portion 127 of the sync field 124.

The confirmation module 118 may include logic to compare the second portion of the sync word 130 to the second portion 127 of the sync field 124 in order to determine whether the sync word 130 is correct. For example, the comparison logic may compare each bit of the second portion of the sync word 130 to a corresponding bit of the second portion 127 of the sync field 124 to determine whether a match is detected (e.g., whether the sync word 130 is correct). Depending on whether the sync word 130 is correct, the confirmation module 118 may selectively stop the demodulator 116 (e.g. if no match is detected), as shown by the dashed line in FIG. 1.

In a particular embodiment, the confirmation module 118 determines whether the sync word 130 generated by the sync word detection module 114 is correct based on the first portion 126 and the second portion 127 of the sync field 124 (e.g., an entirety of the sync field 124). For example, the confirmation module 118 may receive at least the first portion 126 of the sync field 124 from the acquisition module 112 or the sync word detection module 114. In a particular embodiment, a correlator or an energy detector associated with receiving the first portion 126 of the sync field 124 may not be sufficiently powerful to detect small (e.g., one bit or two bit) differences between the first portion 126 of the sync field 124 and the one or more stored sync word values. After initiation of the confirmation module 118, the confirmation module 118 may acquire the second portion 127 of the sync field 124. The confirmation module 118 may make a determination whether the sync word 130 is correct based on a comparison of the sync word 130 to the first portion 126 and the second portion 127 of the sync field 124 (e.g., an entirety of the sync field 124). Accordingly, the confirmation module 118 may include comparison logic to compare the sync word 130 to the first portion 126 and the second portion 127 of the sync field 124. For example, the comparison logic may compare each bit of the sync word 130 to a corresponding bit of the first portion 126 or the second portion 127 of the sync field 124 to determine whether a match is detected (e.g., whether the sync word 130 is correct).

During operation of the wireless receiver device 102, the receiver 104 may receive and process the packet 122. After identification (e.g., detection) of the packet 122 by the packet detection module (not shown), the acquisition module 112 may receive the first portion 126 of the sync field 124. The sync word detection module 114 may select (e.g., generate) the sync word 130 based on less than an entirety of the sync field 124 (e.g., based on the first portion 126 of the sync field 124). For example, the sync word detection module 114 may select the sync word 130 based on the first portion 126 of the sync field 124 and before the second portion 127 of the sync field 124 is received by the receiver 104.

The confirmation module 118 and the demodulator 116 may be initiated after the first portion 126 of the sync field 124 is received. The demodulator 116 may be initiated based on the sync word 130. The confirmation module 118 may receive at least the second portion 127 of the sync field 124 and may determine whether the sync word 130 is correct. The demodulator 116 may continue demodulation of the payload field 132 when the sync word 130 is determined to be correct, and may stop demodulation of the payload field 132 when the sync word 130 is determined to be incorrect (e.g., is not confirmed).

By initiating certain demodulator activities within the demodulator 116 prior to the receiver 104 receiving a final bit (e.g., a last bit) of the sync field 124, the demodulator 116 may be sufficiently primed and can thereby perform demodulation promptly upon receipt of the payload field 132. This approach avoids use of trailer bits or other intermediate bits between the sync field 124 and the payload field 132. Additionally, this approach avoids buffering data to provide sufficient time for the demodulator 116 to be primed after receiving the sync field 124 and before processing payload data of the payload field 132. Additionally, by generating the sync word 130, the demodulator 116 may be advantageously synchronized and perform other early demodulation functions to enable prompt demodulation of the payload data of the payload field 132 upon receipt of an initial bit of the payload field 132 by the receiver 104.

Figure 2:
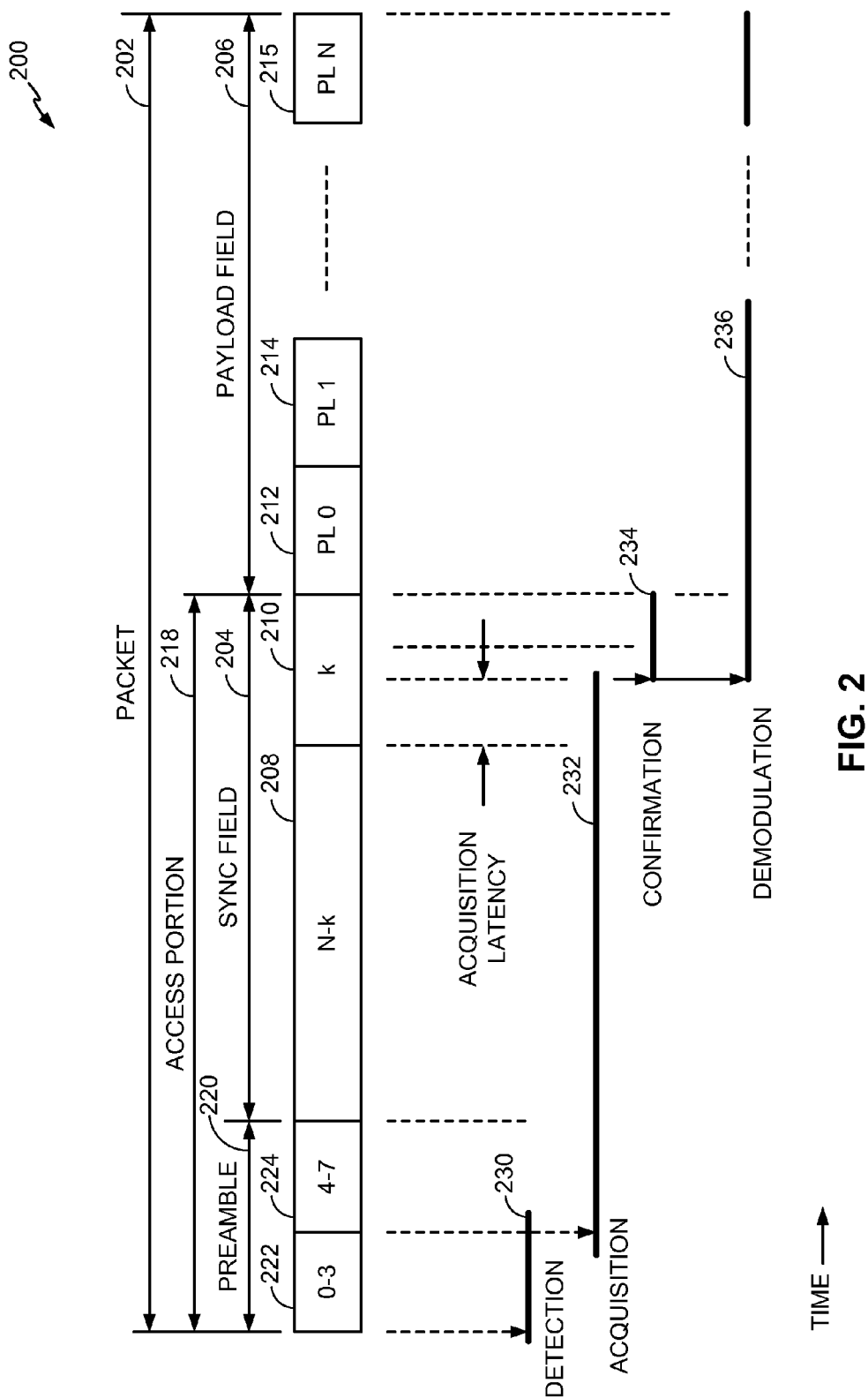
FIG. 2 is a timing diagram that illustrates a communication scheme to receive a packet at a wireless receiver device.

Referring to FIG. 2, a timing diagram 200 of a communication scheme to receive a data packet 202 at a wireless receiver device is illustrated. For example, the data packet 202 may correspond to the packet 122 of FIG. 1. FIG. 2 shows various stages of processing the data packet 202 over time (e.g., processing cycles) that may be performed by a receiver, such as the receiver 104 of FIG. 1.

The data packet 202 may include an access portion 218 (e.g., an access code) and a payload field 206. For example, the payload field 206 may correspond to the payload field 132 of FIG. 1. The access portion 218 may include a preamble field 220 and a sync field 204 (e.g., a sync word field or unique word field). For example, the preamble field 220 and the sync field 204 may correspond to the preamble field 123 and the sync field 124 of FIG. 1, respectively.

The preamble field 220 may include one or more bits, such as eight bits (e.g., one byte) and the sync field 204 may include N bits (e.g., N symbols). The payload field 206 may be a next sequential portion of the data packet 202 subsequent to the sync field 204. The sync field 204 may include a sync identifier (e.g., a sync word) that corresponds to a timing scheme to be used by a demodulator to demodulate the payload field. For example, the sync identifier may be used to calculate timing and frequency estimations to be used by the demodulator, such as the demodulator 116 of FIG. 1, to demodulate data in the payload field 206. In a particular embodiment, the data packet 202 may have a low energy (LE) format, as shown in FIG. 3, or an ANT format, as shown in FIG. 4. In a particular embodiment, the data packet 202 has the ANT format and the sync field 204 corresponds to a network address field of the data packet 202.

During reception of the data packet 202, the data packet 202 may be identified by the receiver during a detection stage 230. For example, the detection stage 230 may be a RF detection stage configured to detect energy associated with a packet transmission, such as a transmission of the data packet 202. The data packet 202 may be identified during reception of the preamble field 220. Detection of the data packet 202 may occur based on a first preamble portion 222 of the preamble field 220. In a particular embodiment, the first preamble portion 222 is less than an entirety of the preamble field 220 that includes the first preamble portion 222 and a second preamble portion 224. For example, where the preamble field 220 is eight bits (e.g., one byte), the first preamble portion 222 includes bits 0-3 of the preamble field 220 and the second preamble portion 224 includes bits 4-7 of the preamble field 220.

In response to identifying the data packet 202, an acquisition stage 232 of the receiver may be initiated. The acquisition stage 232 may be initiated during reception of the preamble field 220 and prior to reception of the sync field 204. For example, the acquisition stage 232 may be associated with the acquisition module 112 of FIG. 1. During the acquisition stage 232, an end of the preamble field 220 and a beginning of the sync field 204 may be identified.

A first sync portion 208 of the sync field 204 may be received during the acquisition stage 232. The sync field 204 may include a total of N bits and may be divided into the first sync portion 208 and a second sync portion 210. For example, the first sync portion 208 and the second sync portion 210 may correspond to the first portion 126 and the second portion 127, respectively, of the sync field 124 of FIG. 1. The first sync portion 208 may include N-k bits (e.g., symbols), where k is an integer, and the second sync portion 210 may include k bits. A value of k may be determined based on a primer period of the demodulator (e.g., k may be a particular number of bits that allows the demodulator to have sufficient time to be primed prior to receipt of the payload field 206). For example, the value of k may be determined based on a time period for the demodulator to be synchronized with the data packet 202 and to be initialized to process incoming data of the data packet 202. In a particular embodiment, k is equal to two. Accordingly, the first sync portion 208 includes less than an entirety of the sync field 204. Additionally, the second sync portion 210 of the sync field 204 is distinct from the first sync portion 208 of the sync field 204.

In a particular embodiment, each bit (e.g., a data bit) of the first sync portion 208 received during the acquisition stage 232 may be processed by detecting the bit, identifying a value of the first bit, and storing the value of the bit. For example, a value of each bit of the first sync portion 208 may be stored in a register. A sync word may be identified (e.g., detected) based on the first sync portion 208 acquired during the acquisition stage 232. For example, the sync word may be identified after the first sync portion 208 is received and processed. The sync word may correspond to the sync word 130 of FIG. 1. For example, the sync word may be generated based on the first sync portion 208 of the sync field 204 (e.g., based on less than an entirety of the sync field 204).

The acquisition stage 232 may be directed to stop in response to processing a last bit of the first sync portion 208 of the sync field 204. In a particular embodiment, the acquisition stage 232 is not concluded (e.g., stopped) until a time period after the direction to stop as a result of latency (e.g., acquisition latency) associated with hardware and/or software processing of a bit during the acquisition stage 232, as shown in FIG. 2. Although an end of the acquisition stage 232 and a beginning of the confirmation stage 234 are shown as occurring during receipt of the second sync portion 210, the timing shown is illustrative. Timing of the end of the acquisition stage 232 and the beginning of the confirmation stage 234 in relation to receipt of the second sync portion 210 may vary based on a length of the acquisition latency. For example, one or more bits of the second sync portion 210 may be received during the acquisition latency of the acquisition stage 232 and may be passed (e.g., provided to) the confirmation stage 234. Each bit of the second sync portion 210 is received and confirmed, as described further herein, prior to processing of an initial bit of the payload field 206.

After the acquisition stage 232 is stopped (e.g., concluded), the confirmation stage 234 of the receiver may be initiated. For example, the confirmation stage 234 may be associated with the confirmation module 118 of FIG. 1. During the confirmation stage 234, the second sync portion 210 of the sync field 204 may be received by the receiver.

During the confirmation stage 234, a determination may be made whether the selected sync word is correct based on at least the second sync portion 210 of the sync field 204. For example, the confirmation stage 234 may determine whether the sync word is correct by determining whether each bit (e.g., including a last sequential bit) of the second sync portion 210 of the sync field 204 matches a corresponding bit of the sync word. In a particular embodiment, a determination whether the selected sync word is correct is made based on the first sync portion 208 and the second sync portion 210 of the sync field 204 (e.g., an entirety of the sync field 204).

A demodulation stage 236 is initiated prior to receiving the payload field 206. For example, the demodulation stage 236 may be associated with a demodulator, such as the demodulator 116 of FIG. 1. The demodulator may be primed during the demodulation stage 236 based on the sync word. The payload field 206 may be received and demodulated during the demodulation stage 236 using the demodulator. The demodulation stage 236 is initiated prior to receiving the initial bit of the payload field 206. The payload field 206 may include one or more payload sections (PL0-N) 212-215. Each payload section (PL0-N) 212-215 may include one or more bits. In a particular embodiment, the demodulation stage 236 is initiated prior to receiving a first bit (e.g., the initial bit) of the payload section (PL0) 212.

In a particular embodiment, the demodulation stage 236 and the confirmation stage 234 are initiated substantially simultaneously (e.g., the confirmation stage 234 occurs concurrently with the demodulation stage 236). In the particular embodiment, the demodulation stage 236 and the confirmation stage 234 are initiated approximately two processing cycles before a first bit of the payload field 206 is received. In another particular embodiment, the demodulation stage 236 and the confirmation stage 234 are initiated in response to a conclusion of the acquisition stage 232. In an alternative embodiment, the confirmation stage 234 and the demodulation stage 236 may be initiated at different times. For example, the demodulation stage 236 may be initiated after receipt of the first sync portion 208 of the sync field 204, but due to acquisition latency, the confirmation stage 234 may be initiated after receipt of a first bit of the second sync portion 210 of the sync field 204.

The demodulation stage 236 may be selectively stopped based on a determination whether the sync word is correct during the confirmation stage 234. For example, the demodulation stage 236 may be initiated prior to receipt of the first bit of the payload field 206. In response to a determination during the confirmation stage 234 that the sync word is correct, the demodulation stage 236 may continue and the payload field 206 may be demodulated by the demodulator. In response to a determination during the confirmation stage 234 that the sync word is incorrect, the demodulator may be stopped during the demodulation stage 236 and the payload field 206 may not be demodulated.

By initiating the demodulator during receipt of the second sync portion 210 of the sync field 204, priming of the demodulator may begin prior to receipt of the initial bit of the payload field 206. This approach provides an advantage in that a delay (e.g., buffering or trailer bits) is not needed to process the payload field 206 of the data packet 202.

Referring to FIG. 3, a timing diagram 300 that illustrates a communication scheme to receive a data packet 301 having a low energy (LE) format is disclosed. The timing diagram 300 may be representative of a timing sequence (e.g., over a time period) of the wireless receiver device 102 when the wireless receiver device 102 receives the packet 122, as described with respect to FIG. 1. The data packet 301 may correspond to the packet 122 of FIG. 1 or the data packet 202 of FIG. 2.

Providing further details with respect to the data packet 301, the illustrated LE packet may include a preamble 302, an access code 304, and an LE payload 306. In a particular embodiment, the access code 304 corresponds to the sync field 124 of FIG. 1 and/or the sync field 204 of FIG. 2, and the LE payload 306 corresponds to the payload field 132 of the packet 122 of FIG. 1 and/or the payload field 206 of the packet 202 of FIG. 2. The timing diagram 300 further includes an acquisition stage 308, a confirmation stage 310, and a demodulation stage 312. The acquisition stage 308, the confirmation stage 310, and the demodulation stage 312 may correspond to the acquisition stage 232, the confirmation stage 234, and the demodulation stage 236 of FIG. 2, respectively.

The acquisition stage 308 may begin during the preamble 302 (e.g., after the data packet 301 is detected) or at a transition between the preamble 302 and the access code 304. The acquisition stage 308 may end at a point (e.g., a time) prior to the transition between the access code 304 and the LE payload 306. For example, the acquisition stage 308 may conclude at a boundary that is defined between a first portion of the access code 304 and a second portion of the access code 304, or at a later point (e.g., during receipt of the second portion of the access code 304) due to acquisition latency. During, or at the end, of the acquisition stage 308, a sync word may be generated based on a first portion of the access code 304. For example, the sync word may be generated, or selected, by the sync word detection module 114 of FIG. 1. The sync word may include a portion that corresponds to the second portion of the access code 304. The sync word may represent a value of the access code 304 (e.g., a sync word) that is determined prior to an entirety of the access code 304 being received.

For example, the access code 304 of the data packet 301 having the LE format may be 32 bits. The first portion of the access code 304 may include bits 0-29 and the second portion of the access code 304 may include bits 30-31. The first thirty bits (e.g., bits 0-29) may be received during the acquisition stage 308. The sync word may be based on the bits 0-29 and may include unconfirmed (e.g., un-received) bits 30-31 (e.g., the last two bits of the access code 304). A number of bits included in the first portion and the second portion of the access code 304 may be determined based on a latency (e.g., a hardware latency, a software latency, or a combination thereof) associated with a primer period of a demodulator being a length of two processing cycles (e.g., a time period associated with processing two bits, such as the last two bits of the access code 304).

As illustrated in FIG. 3, the confirmation stage 310 and the demodulation stage 312 may start during receipt (e.g., prior to completion) of the access code 304. For example, both the confirmation stage 310 and the demodulation stage 312 may be initiated at the boundary that is defined between the first portion of the access code 304 and the second portion of the access code 304 (e.g., a boundary between bit 29 and bit 30 of the access code 304). Thus, the demodulation stage 312 may begin prior to a transition that indicates the first bit of the LE payload 306. In a particular embodiment, the confirmation stage 310 and the demodulation stage 312 may be initiated concurrently (e.g., substantially simultaneously). Activities performed during an initial portion of the demodulation stage 312 may include clock recovery, synchronization, other configuration or early start activities in preparation of the demodulator being enabled (e.g., primed) to perform demodulation of data within the LE payload 306, or a combination thereof. Thus, the demodulation stage 312 may be initiated based on the sync word that is generated prior to an entirety of the access code 304 being received.

The confirmation stage 310 may determine (e.g., verify) whether the sync word is correct at least by determining whether a portion of the sync word matches the second portion of the access code 304. For example, the portion of the sync word may correspond to the second portion of the access code 304 that is not received at the time when the sync word is generated (e.g., selected). In a particular embodiment, the confirmation stage 310 verifies that the sync word is correct by determining whether the sync word matches the first portion and the second portion of the access code 304. When the confirmation stage 310 results in a determination that the portion of the sync word matches the second portion of the access code 304, demodulation may continue during the demodulation stage 312 to demodulate the LE payload 306. After the demodulation stage 312 demodulates an entirety of the LE payload 306, the demodulation stage 312 may be terminated. Alternatively, when the confirmation stage 310 results in a determination that the sync word is not correct, the demodulation stage 312 may be terminated (e.g., stopped) prior to an entirety of the LE payload 306 being demodulated. After the demodulation stage 312 is terminated, a detection stage (not shown) may detect a next packet to be received by the wireless receiver device (e.g., the wireless receiver device 102).

Referring to FIG. 4, a timing diagram 400 that illustrates a communication scheme to receive a data packet 401 including an ANT format is disclosed. The ANT format is a particular format of packet transmission associated with Bluetooth devices. The timing diagram 400 may be representative of a timing sequence (e.g., over a time period) of the wireless receiver device 102 when the wireless receiver device 102 receives the packet 122, as described with respect to FIG. 1. The data packet 401 having the ANT format may include the packet 122 of FIG. 1 and/or the data packet 202 of FIG. 2. The timing diagram 400 also includes an acquisition stage 414, a confirmation stage 416, and a demodulation stage 418. The acquisition stage 414, the confirmation stage 416, and the demodulation stage 418 may correspond to the acquisition stage 232, the confirmation stage 234, and the demodulation stage 236 of FIG. 2, respectively.

Providing further details with respect to the data packet 401, the illustrated ANT packet may include a preamble 402, a network address 404, a device address 406, a control 408, a data payload 410, and a cyclical redundancy check (CRC-CCITT) field 412. In a particular embodiment, the network address 404 corresponds to the sync field 124 of FIG. 1 and the sync field 204 of FIG. 2. The device address 406, the control 408, the data payload 410, and the CRC-CCITT field 412 may collectively, or each individually, correspond to the payload field 132 of the packet 122 of FIG. 1 and/or the payload field 206 of the packet 202 of FIG. 2.

The acquisition stage 414 may be initiated during receipt of the preamble 402 (e.g., after the data packet 401 is detected) or during a transition between the preamble 402 and the network address 404. During the acquisition stage 414, the network address 404 may be acquired by a receiver, such as the receiver 104 of FIG. 1. The acquisition stage 414 may end at a point (e.g., a time) prior to the transition between the network address 404 and the device address 406. For example, the acquisition stage 414 may conclude at a boundary that is defined between a first portion of the network address 404 and a second portion of the network address 404, or at a later point (e.g., during receipt of the second portion of the network address 404) due to acquisition latency. During, or at the end of, the acquisition stage 414, a sync word may be generated based on the first portion of the network address 404. For example, the sync word may be generated, or selected, by the sync word detection module 114 of FIG. 1. The sync word may include a portion that corresponds to the second portion of the network address 404. The sync word may represent a value of the network address 404 (e.g., a sync word) that is determined prior to an entirety of the network address 404 being received.

For example, the network address 404 of the data packet 401 having the ANT format may be 16 bits. The first portion of the network address 404 may include bits 0-13 and the second portion of the network address 404 may include bits 14-15. The first fourteen bits (e.g., bits 0-13) may be received during the acquisition stage 414. The sync word may be based on the bits 0-13 and may include un-received (e.g., unconfirmed) bits 14-15 (e.g., the last two bits of the network address 404). A number of bits included in the first portion and the second portion of the network address 404 may be determined based on a latency (e.g., a hardware latency, a software latency, or a combination thereof) associated with a primer period of a demodulator being a length of two processing cycles (e.g., a time period associated with processing two bits, such as the last two bits of the network address 404).

As illustrated in FIG. 4, both the confirmation stage 416 and the demodulation stage 418 may be initiated during reception of the network address 404. For example, the confirmation stage 416 and the demodulation stage 418 may be initiated at the boundary that is defined between the first portion of the network address 404 and the second portion of the network address 404. In a particular embodiment, the confirmation stage 416 and the demodulation stage 418 may be initiated concurrently (e.g., substantially simultaneously). Activities performed during an initial portion of the demodulation stage 418 may include clock recovery, synchronization, other configuration or early start activities in preparation of the demodulator being enabled (e.g., primed) to perform demodulation of data within the data packet 401 (e.g., the device address 406, the control 408, the data payload 410, and the CRC-CCITT field 412), or a combination thereof.

Prior to or at a conclusion of the acquisition stage 414, the sync word may be passed to the demodulation stage 418. The demodulation stage 418 may include activities to prime a demodulator based on the sync word. For example, the activities may include synchronizing timing for receiving the data packet 401, recovering a clock signal related to the synchronization, other configuration or early start activities in preparation for the demodulator being enabled (e.g., primed) to perform demodulation of data within the data packet 401, or a combination thereof. The activities may enable the demodulator, such as the demodulator 116 of FIG. 1, to demodulate the device address 406, the control 408, the data payload 410, the CRC-CCITT field 412, or a combination thereof. Thus, the demodulation stage 418 may be initiated based on the sync word that is selected (e.g., generated) prior to an entirety of the network address 404 being received.

During the confirmation stage 416, a determination may be made whether the sync word is correct based at least in part on the second portion of the network address 404. For example, the sync word may be confirmed (e.g., verified) to be correct based on a determination that at least a portion of the sync word matches the second portion of the network address 404. In a particular embodiment, the confirmation stage 416 confirms whether or not the sync word is correct based on a comparison of the sync word to the first portion and the second portion of the network address 404. When the confirmation stage 416 results in a determination that the sync word is correct (e.g., confirmed), the demodulation stage 418 may continue demodulation of the device address 406, the control 408, the data payload 410, the CRC-CCITT field 412, or a combination thereof. After the demodulation stage 418 demodulates an entirety of the device address 406, the control 408, the data payload 410, and the CRC-CCITT field 412, the demodulation stage 418 may be terminated. Alternatively, when the confirmation stage 416 results in a determination that the sync word is incorrect, the demodulation stage 418 may be terminated (e.g., stopped) prior to demodulating the entirety of the device address 406, the control 408, the data payload 410, the CRC-CCITT field 412, or a combination thereof. After the demodulation stage 418 is terminated, a detection stage (not shown) may detect a next packet to be received, as described with respect to FIG. 3.

Figure 5:
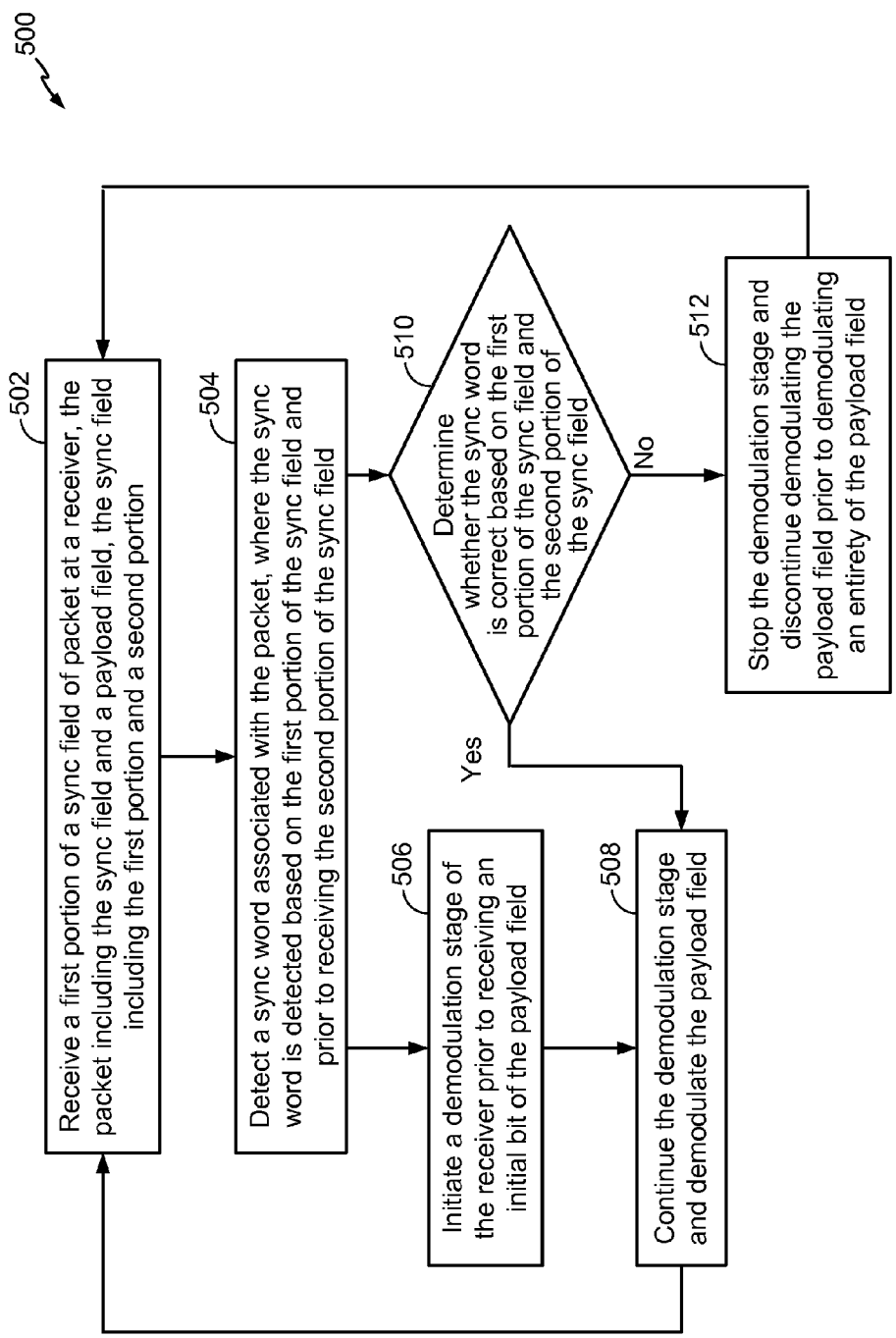
FIG. 5 is a flow diagram of an illustrative embodiment of a method to process a data packet at a wireless receiver device.

Referring to FIG. 5, an illustrative embodiment of a method 500 to process a data packet at a wireless receiver device is shown. For example, the data packet may correspond to the packet 122 of FIG. 1, the data packet 202 of FIG. 2, the data packet 301 of FIG. 3, or the data packet 401 of FIG. 4. The wireless receiver device may correspond to the wireless receiver device 102 of FIG. 1.

A first portion of a sync field of a packet is received at a receiver, at 502. The receiver may be the receiver 104 of FIG. 1. The packet may include the sync field and a payload field. For example, the sync field may correspond to the sync field 124 of FIG. 1, the sync field 204 of FIG. 2, the access code 304 of FIG. 3, or the network address 404 of FIG. 4, and the payload field may correspond to the payload field 132 of FIG. 1, the payload field 206 of FIG. 2, the LE payload 306 of FIG. 3, the device address 406, the control 408, the data payload 410, the CRC-CCITT field 412, or a combination thereof of FIG. 4. The sync field may include the first portion and a second portion. In a particular embodiment, the first portion of the sync field is received during an acquisition stage, such as the acquisition stage 232 of FIG. 2.

A sync word associated with the packet is detected, at 504. The sync word is detected based on the first portion of the sync field and prior to receiving the second portion of the sync field. For example, the sync word may be generated by the sync word detection module 114 of FIG. 1, and the sync word may correspond to the sync word 130 of FIG. 1. In a particular embodiment, the sync word may be detected before an entirety of the sync field is received (e.g., received by a receiver). The sync word may be detected based on a comparison of the first portion of the sync field to one or more stored sync words (e.g., one or more sync field values). Accordingly, the sync word may be detected based on less than an entirety of the sync field.

A demodulation stage of the receiver is initiated prior to receiving an initial bit of the payload field, at 506. The demodulation stage may be initiated based on the sync word.

In a particular embodiment, the demodulation stage may be initiated prior to the receiver receiving an entirety of the sync field of the packet. The demodulation stage may be associated with the demodulator, such as the demodulator 116 of FIG. 1, and include synchronizing and initializing (e.g., priming) the demodulator based on the sync word. Demodulation may be continued and the payload field may be demodulated, at 508.

A determination whether the sync word is correct based on the first portion of the sync field and the second portion of the sync field is made, at 510. For example, a determination may be made whether the sync word includes each bit of the first portion and the second portion of the sync field (e.g., an entirety of the sync field). The determination may be made during a confirmation stage. In a particular embodiment, the confirmation stage occurs in parallel (e.g., concurrently) with the demodulation stage. When a determination is made that the sync word is correct, processing advances to 508, where the demodulation stage may be continued and the payload field of the packet may be demodulated. Processing may then continue back to 502.

Alternatively, when a determination is made that the sync word is incorrect, processing advances to 512, where the demodulation stage may be stopped and where demodulating the payload field may be discontinued prior to an entirety of the payload field being demodulated. In a particular embodiment, when the determination is made that the sync word is incorrect, the demodulation stage may be stopped, at 512, prior to any portion of the payload field being demodulated, at 508. However, in an alternate embodiment, demodulation of the payload field may have begun but, upon determining that the sync word is incorrect, demodulation may be stopped prior to completing demodulation of each bit within the payload field. After stopping demodulation of the payload field at 512, further activities with respect to responding to the incorrect sync word may be performed. After performing such actions, processing may return to 502 to receive additional packets.

In a particular embodiment, the method 500 may further include identifying a packet during a detection stage of the receiver. Detecting or identifying the packet may be performed prior to receiving a first portion of the sync field as illustrated at 502. For example, the packet may be identified during a radio frequency (RF) detection stage of a receiver. Additionally or alternatively, the method 500 may transition from the acquisition stage to the demodulation stage after receiving an entirety of the first portion of the sync field. The transition between the acquisition stage and the demodulation stage is illustrated with reference to FIGS. 2-4. The sync word may correspond to the sync field and may be verified based on the second portion of the sync field.

By initiating the demodulation stage based on the sync word that is detected prior to receiving an entirety of the sync field, the demodulator may be initialized in time to demodulate the initial bit of the payload field immediately upon receipt of the initial bit of the payload field. This approach provides an advantage in that the demodulator will thereby not miss any bits of the payload field, while not requiring either use of a trailer or buffering of data of the payload field.

The method 500 of FIG. 5 may be initiated by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 500 of FIG. 5 can be initiated by a processor, such as the processor 610, or a controller, such as the controller 672, that executes instructions stored in the memory 632 and/or the memory 674, as described with respect to FIG. 6.

Figure 6:
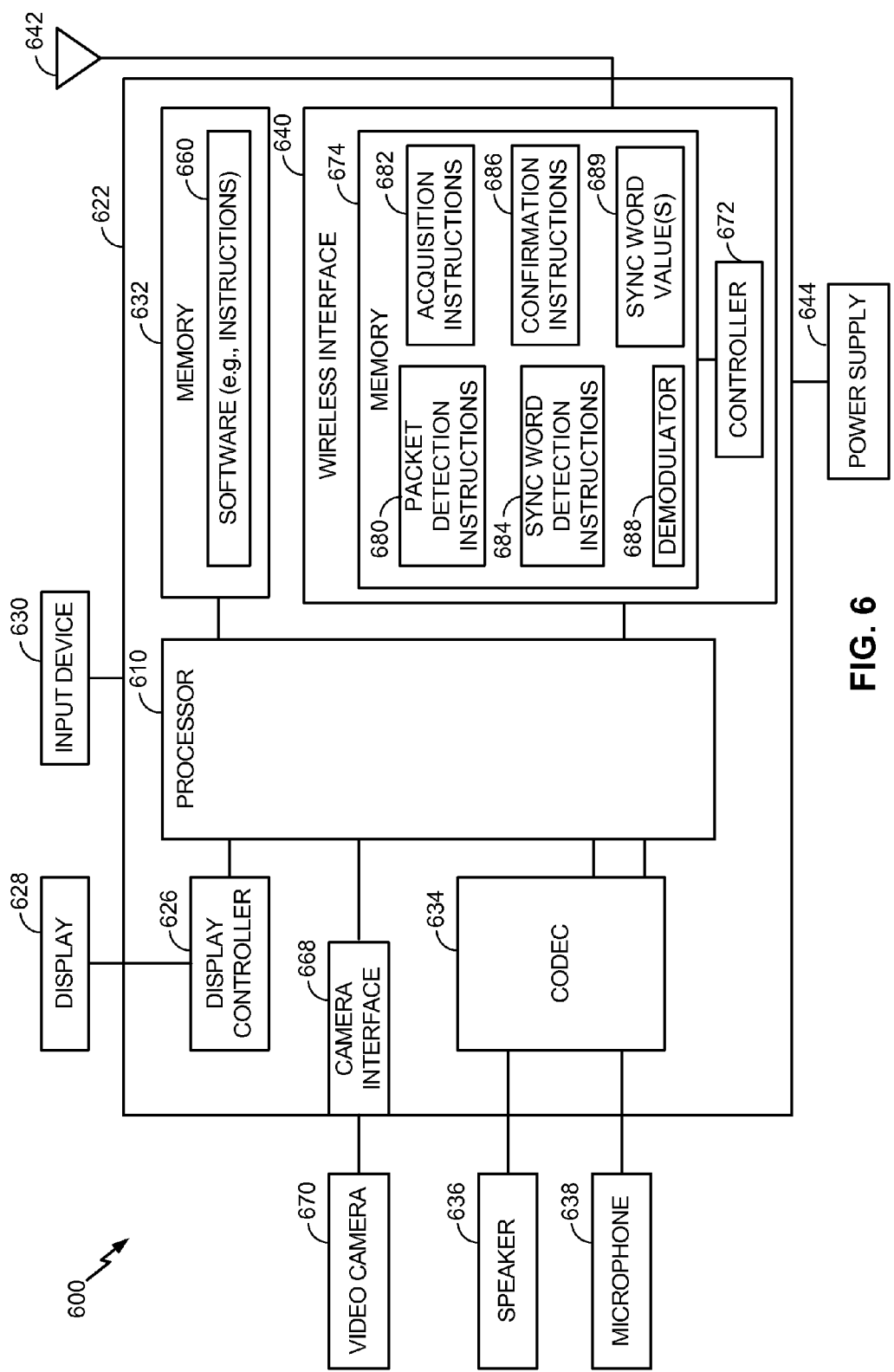
FIG. 6 is a block diagram of a particular embodiment of a wireless communication device including sync word detection logic.

FIG. 6 is a block diagram of a particular embodiment of a device 600 (e.g., a communication device) including sync word detection logic. The device 600 may be a wireless electronic device and may include a processor 610, such as a digital signal processor (DSP), coupled to a memory 632.

The processor 610 may be configured to execute software 660 (e.g., a program of one or more instructions) stored in the memory 632. Additionally or alternatively, the processor 610 may be configured to implement one or more instructions stored in a memory 674 of a wireless interface 640, as described further herein. In a particular embodiment, the processor 610 may be configured to operate in accordance with the method 500 of FIG. 5.

A wireless interface 640 may be coupled to the processor 610 and to an antenna 642 such that wireless data received via the antenna 642 and the wireless interface 640 may be provided to the processor 610. For example, the wireless interface 640 may include or correspond to the receiver 104 of FIG. 1. The wireless interface 640 may include the memory 674 and a controller 672. The memory 674 may include packet detection instructions 680, acquisition instructions 682, sync word detection instructions 684, confirmation instructions 686, a demodulator 688, and one or more sync word values 689. In a particular embodiment, the wireless interface 640 may include the acquisition module 112, the sync word detection module 114, the demodulator 116, and the confirmation module 118 of FIG. 1.

The controller 672 may be configured to interface with the processor 610 to execute one or more instructions stored in the memory 674, such as the packet detection instructions 680, the acquisition instructions 682, the sync word detection instructions 684, the confirmation instructions 686, or a combination thereof. The controller 672 may also be configured to interface with the processor 610 to execute the demodulator 688. Additionally or alternatively, the controller 672 may include a processor configured to execute one or more of the instructions stored in the memory 674. A signal (e.g., an incoming data stream associated with a packet) received via the antenna 642 may be provided to the wireless interface 640. The signal may correspond to the packet 122 of FIG. 1, the data packet 202 of FIG. 2, the data packet 301 of FIG. 3, or the data packet 401 of FIG. 4. The controller 672 may control processing of the signal using one or more of the instructions stored in the memory 674. For example, the controller 672 and memory 674 may be configured to execute the method 500 of FIG. 5. The controller 672 may initiate the demodulator 688 based on a sync word (e.g., a sync word detected before an entirety of a sync field of the signal has been received). The sync word may be identified and selected based on the one or more sync word values 689 stored in the memory 674. For example, the sync word may be selected from the sync word values 689 based on a first portion of a sync field included in a detected packet. An output of the wireless interface 640, such as demodulated payload data associated with a payload field of the signal, may be provided to the processor 610 for further processing, routing, or a combination thereof.

In a particular embodiment, the processor 610 and/or the controller 672 may be configured to execute computer executable instructions, such as instructions 660 or the instructions 680-686, stored at a non-transitory computer-readable medium, such as the memory 632 or the memory 674, that are executable to cause a computer, such as the processor 610 or the controller 672, to receive a first portion of a sync field of a packet. The packet may include the sync field and a payload field. The sync field may include the first portion and a second portion. The computer executable instructions 660 or 680-686 may be further executable to detect a sync word associated with the packet. The sync word is detected based on the first portion of the sync field and prior to receiving the second portion of the sync field. The computer executable instructions 660 or 680-686 may be further executable to initiate a demodulator (e.g., the demodulator 688) prior to receiving an initial bit of the payload field.

A camera interface 668 may be coupled to the processor 610 and may also be coupled to a camera, such as a video camera 670. A display controller 626 may be coupled to the processor 610 and to a display device 628. A coder/decoder (CODEC) 634 may also be coupled to the processor 610. A speaker 636 and a microphone 638 may be coupled to the CODEC 634.

In a particular embodiment, the processor 610, the display controller 626, the memory 632, the CODEC 634, the wireless interface 640, and the camera interface 668 are included in a system-in-package or system-on-chip device 622. In a particular embodiment, an input device 630 and a power supply 644 are coupled to the system-on-chip device 622. Moreover, in a particular embodiment, as illustrated in FIG. 6, the display device 628, the input device 630, the speaker 636, the microphone 638, the antenna 642, the video camera 670, and the power supply 644 are external to the system-on-chip device 622. However, each of the display device 628, the input device 630, the speaker 636, the microphone 638, the antenna 642, the video camera 670, and the power supply 644 can be coupled to one or more components of the system-on-chip device 622, such as one or more interfaces or controllers.

In conjunction with one or more of the described embodiments, an apparatus is disclosed that may include means for receiving a first portion of a sync field of a packet. The means for receiving the first portion of the sync field of the packet may include the acquisition module 112 of the receiver 104 of FIG. 1, the processor 610, the controller 672, the acquisition instructions 682 of FIG. 6, one or more other devices or circuits configured to receive a first portion of a sync field of a packet, or any combination thereof. The packet may include the sync field and a payload field. The packet may correspond to the packet 122 of FIG. 1, the data packet 202 of FIG. 2, the data packet 301 of FIG. 3, the data packet 401 of FIG. 4, or any combination thereof. The sync field may include the first portion and a second portion.

The apparatus may also include means for detecting a sync word associated with the packet. The sync word may be detected based on the first portion of the sync field and prior to receiving the second portion of the sync field. The means for detecting the sync word may correspond to the sync word detection module 114 of FIG. 1, the processor 610, the controller 672, the sync word detection instructions 684 of FIG. 6, one or more other devices or circuits configured to detect the sync word, or any combination thereof.

The apparatus may also include means for initiating a demodulator prior to receiving an initial bit of the payload field. The means for initiating the demodulator may correspond to the sync word detection module 114 of FIG. 1, the processor 610, the controller 672, the sync word detection instructions 684 of FIG. 6, one or more other devices or circuits configured to initiate a demodulator, or any combination thereof. The demodulator may correspond to the demodulator 116 of FIG. 1, the demodulator 686 of FIG. 6, one or more other devices or circuits configured to demodulate data of a packet, or any combination thereof.

In a particular embodiment, the apparatus may further include means for determining whether the detected sync word is correct based on at least the second portion of the sync field. The means for determining whether the detected sync word is correct may correspond to the confirmation module 118 of FIG. 1, the processor 610, the controller 672, the confirmation instructions 688 of FIG. 6, one or more other devices or circuits configured to confirm whether the sync word is correct, or any combination thereof.

The apparatus may further include means for processing a demodulated payload field. The means for processing the demodulated payload may correspond to the control logic 120 of FIG. 1, the processor 610 of FIG. 6, one or more other devices or circuits configured to process a demodulated payload field, or any combination thereof.

One or more of the disclosed embodiments may be implemented in a system or an apparatus, such as the device 600, that may include a communications device, a fixed location data unit, a mobile location data unit, a mobile phone, a cellular phone, a satellite phone, a computer, a tablet, a portable computer, or a desktop computer. Additionally, the device 600 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-6 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

Those of skill would further appreciate that the various illustrative logical blocks, configurations, modules, circuits, and algorithm steps described in connection with the embodiments disclosed herein may be implemented as electronic hardware, computer software executed by a processor, or a combination thereof. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An illustrative storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    receiving a first portion of a sync field of a packet at a receiver, wherein the sync field includes the first portion and a second portion, and wherein the packet comprises the sync field and a payload field;
    detecting a sync word associated with the packet, wherein the sync word is detected based on the first portion of the sync field and prior to receiving the second portion of the sync field; and
    initiating a demodulation stage of the receiver prior to receiving an initial bit of the payload field.

2. The method of claim 1, wherein the demodulation stage includes performing initial demodulation activity via a demodulator using the detected sync word.

3. The method of claim 1, further comprising determining, during a confirmation stage of the receiver, whether the detected sync word is correct based on both the first portion of the sync field and the second portion of the sync field.

4. The method of claim 3, further comprising continuing demodulation to demodulate the payload field during the demodulation stage in response to a determination that the detected sync word is correct.

5. The method of claim 3, further comprising stopping demodulation of the payload field in response to a determination that the detected sync word is incorrect, wherein the demodulation is stopped prior to demodulating an entirety of the payload field.

6. The method of claim 1, further comprising identifying the packet during a radio frequency (RF) detection stage of the receiver.

7. The method of claim 6, further comprising initiating an acquisition stage of the receiver in response to identifying the packet to be received.

8. The method of claim 1, wherein the first portion of the sync field is received during an acquisition stage of the receiver.

9. The method of claim 8, further comprising transitioning from the acquisition stage to the demodulation stage after receiving an entirety of the first portion of the sync field.

10. The method of claim 1, wherein at least one bit of a second portion of the sync field is received by the receiver during the demodulation stage.

11. The method of claim 1, further comprising initiating a confirmation stage of the receiver after the first portion of the sync field is received by the receiver.

12. The method of claim 1, further comprising determining, during a confirmation stage of the receiver, whether the detected sync word is correct based on a determination whether the sync word includes each bit of the first portion of the sync field and each bit of the second portion of the sync field.

13. The method of claim 1, wherein a number of bits in the second portion of the sync field is determined based on a primer time period of a demodulator, and wherein the demodulation stage is initiated prior to receiving a first bit of the payload field at the receiver.

14. The method of claim 1, wherein the demodulation stage and a confirmation stage are initiated substantially simultaneously.

15. The method of claim 1, wherein the demodulation stage is initiated prior to receiving an entirety of the sync field.

16. The method of claim 1, wherein the detected sync word is based on one or more stored sync field values, and wherein the sync word is detected based on less than an entirety of the sync field.

17. A wireless receiver device comprising:
    a receiver configured to receive a packet, the packet comprising a sync field and
    a payload field, the receiver comprising:
        an acquisition module configured to receive a first portion of the sync field, wherein the sync field includes the first portion and a second portion;
        a detection module configured to detect a sync word associated with the packet, wherein the sync word is detected based on the first portion of the sync field and prior to receiving the second portion of the sync field; and
        a demodulator configured to be initiated prior to receiving an initial bit of the payload field.

18. The wireless receiver device of claim 17, further comprising control logic configured to enable processing of a demodulated payload, wherein the receiver further comprises:
    a radio frequency (RF) detection module configured to identify the packet; and
    a confirmation module configured to determine whether the detected sync word is correct based on at least the second portion of the sync field.

19. The wireless receiver device of claim 17, further comprising a confirmation module configured to determine whether the detected sync word is correct based on the first portion of the sync field and the second portion of the sync field.

20. The wireless receiver device of claim 17, wherein the sync field corresponds to a sync identifier associated with recovering a clock signal to be used by the demodulator to demodulate the payload field.

21. The wireless receiver device of claim 17, wherein the packet comprises an access portion and the payload field, wherein the access portion comprises a preamble field and the sync field.

22. The wireless receiver device of claim 17, wherein the payload field sequentially follows in the packet after the sync field.

23. The wireless receiver device of claim 17, wherein the packet has an ANT format or a low energy (LE) format.

24. The wireless receiver device of claim 17, wherein the demodulator performs an initial demodulation activity using the detected sync word.

25. An apparatus comprising:
    means for receiving a first portion of a sync field of a packet, wherein the sync field includes the first portion and a second portion, and wherein the packet includes the sync field and a payload field;

means for detecting a sync word associated with the packet, wherein the sync word is detected based on the first portion of the sync field and prior to receiving the second portion of the sync field; and means for initiating a demodulator prior to receiving an initial bit of the payload field.

26. The apparatus of claim 25, further comprising:

means for determining whether the detected sync word is correct based on at least the second portion of the sync field.

27. The apparatus of claim 25, further comprising means for processing a demodulated payload field.

28. The apparatus of claim 25, wherein the demodulator is configured to perform initial demodulation activity using the sync word.

29. The apparatus of claim 25, wherein the demodulator is initiated prior to receiving an entirety of the sync field.

30. A non-transitory computer readable medium comprising instructions that, when executed by a processor, cause the processor to perform operations comprising:

receiving a first portion of a sync field of a packet, wherein the sync field includes the first portion and a second portion, and wherein the packet includes the sync field and a payload field;

detecting a sync word associated with the packet, wherein the sync word is detected based on the first portion of the sync field and prior to receiving the second portion of the sync field; and initiating a demodulator prior to receiving an initial bit of the payload field.

31. The non-transitory computer readable medium of claim 30, wherein the operations comprise determining whether the detected sync word is correct based on both the first portion of the sync field and the second portion of the sync field.

32. The non-transitory computer readable medium of claim 31, wherein the operations comprise stopping the demodulator in response to a determination that the detected sync word is incorrect, wherein the demodulator is stopped prior to demodulating an entirety of the payload field.

33. The non-transitory computer readable medium of claim 30, wherein the operations comprise identifying the packet during radio frequency (RF) detection.

34. The non-transitory computer readable medium of claim 30, wherein the operations comprise initiating a confirmation of the detected sync word after the first portion of the sync field is received.

* * * * *